United States Patent [19]
Eftechiou

[11] Patent Number: 6,002,747
[45] Date of Patent: *Dec. 14, 1999

[54] TELEPHONE PRIVACY AND ALERTING DEVICE

[75] Inventor: Vakis Eftechiou, Mississauga, Canada

[73] Assignee: Omega Electronics Inc., Downsview, Canada

[*] Notice: This patent is subject to a terminal disclaimer.

[21] Appl. No.: 08/924,126

[22] Filed: Sep. 5, 1997

Related U.S. Application Data

[63] Continuation-in-part of application No. 08/779,314, Jan. 6, 1997, Pat. No. 5,796,789.

[51] Int. Cl.$^6$ .................................................. H04M 1/24
[52] U.S. Cl. ................................. 379/35; 379/7; 379/47; 379/27
[58] Field of Search .............................. 379/1, 7, 24, 27, 379/30, 32–35, 47–48, 37, 42

[56] References Cited

U.S. PATENT DOCUMENTS

| | | |
|---|---|---|
| 2,269,141 | 1/1942 | Campbell . |
| 3,499,121 | 3/1970 | McIntosh et al. . |
| 3,514,544 | 5/1970 | Chambers . |
| 3,786,501 | 1/1974 | Marnerakis ............................ 340/509 |
| 4,000,376 | 12/1976 | Springer . |
| 4,051,333 | 9/1977 | Schomburg .............................. 379/21 |
| 4,060,700 | 11/1977 | Magnusson . |
| 4,136,266 | 1/1979 | Cohen et al. . |
| 4,230,914 | 10/1980 | Korwin et al. . |
| 4,373,120 | 2/1983 | McDonald . |
| 4,434,328 | 2/1984 | Fields . |
| 4,443,665 | 4/1984 | Alderman . |
| 4,444,999 | 4/1984 | Sparrevohn . |
| 4,726,048 | 2/1988 | Waldman et al. . |
| 4,747,128 | 5/1988 | Chan et al. . |
| 4,805,210 | 2/1989 | Griffith, Jr. . |
| 4,807,278 | 2/1989 | Ross . |
| 4,809,317 | 2/1989 | Howe et al. . |
| 4,825,465 | 4/1989 | Ryan . |
| 4,941,166 | 7/1990 | Waldman et al. . |
| 4,969,178 | 11/1990 | Chen et al. ............................... 379/33 |
| 5,231,657 | 7/1993 | Umemoto et al. ........................ 379/61 |
| 5,231,658 | 7/1993 | Eftechiou . |
| 5,559,873 | 9/1996 | Wood et al. . |
| 5,696,810 | 12/1997 | Dunn ....................................... 379/32 |
| 5,796,789 | 8/1998 | Eftechiou ................................. 379/35 |

*Primary Examiner*—Paul Loomis
*Assistant Examiner*—Duc Nguyen
*Attorney, Agent, or Firm*—Barrigar & Moss

[57] ABSTRACT

A telephone privacy and alerting device for connection between a common telephone line and a telephone device. The privacy and alerting device includes a privacy circuit to prevent the telephone device from accessing the telephone line when another telephone device is already off-hook, and an alerting circuit to indicate an alarm when the telephone device is off-hook and a further telephone device is also off-hook. The privacy circuit includes a voice connecting circuit for connection between the telephone line and the telephone device, a self-latching switch means connected to the voice connecting circuit having an on and off state, and voltage breakdown means for turning the self-latching switch means on when a closed circuit is provided through the telephone device and the potential across said telephone line is above a first predetermined threshold, thereby allowing the voice connecting circuit to establish a current path between the telephone line and the telephone device. The alerting circuit includes alarm means for generating an alarm signal when the alarm means receives a first triggering signal and a second triggering signal simultaneously, current monitoring means responsive to the voice connecting circuit and operatively coupled to the alarm means for providing the first triggering signal when current is present in the voice connecting circuit, and further voltage breakdown means operatively coupled to the alarm means for providing the second triggering signal when the potential across the telephone line is below a second predetermined threshold.

21 Claims, 6 Drawing Sheets

TELEPHONE PRIVACY AND ALERTING DEVICE

This application is a continuation-in-part of application Ser. No. 08/779,314 filed Jan. 6, 1997, entitled "Alerting Device For Telephone" now U.S. Pat. No. 5,796,789.

BACKGROUND OF THE INVENTION

The present invention relates to telephone systems and particularly to a device for providing privacy in telephone systems where multiple phones have access to a common telephone line and/or for alerting a user of a phone device connected to the common telephone line when an additional telephone device on the same telephone line is also off-hook.

In many commercial and residential telephone installations there are a number of telephone line operated devices which share a common telephone line. In such installations, various privacy concerns may arise. For example, if someone is talking on one of the telephone devices, another party can pick up a second telephone and eavesdrop on the conversation without the first person being aware. Additionally, if a telephone, modem, fax machine or other telephone device is transmitting information on the telephone line, it is possible for a further telephone, modem, fax machine or other telephone device to connect to the telephone line, thus interfering with the conversation or data transfer taking place on the telephone line. Various devices have been proposed for solving these problems; however the existing devices have various technical or cost disadvantages.

Current anti-eavesdropping and privacy protection devices can generally be broken down into two broad categories—privacy (or exclusion) devices and alerting devices. A privacy device operates by preventing the telephone device that it is connected to from accessing the common line when another telephone device is already off-hook. Privacy devices are generally connected to each telephone device sharing a common line. Alerting devices operate by providing some form of alarm when another telephone device on the common line goes off-hook in addition to the protected telephone device. Alerting devices are usually only connected to the telephone device they are intended to protect.

An example of a privacy device is disclosed in U.S. Pat. No. 5,231,658 issued Jul. 27, 1993, to V. Eftechiou, which discloses a privacy device that can prevent the phone device that it is connected to from accessing a common telephone line if another phone device on the line is already off-hook.

U.S. Pat. No. 4,443,665 issued Apr. 17, 1984 to Alderman also discloses a privacy device which can prevent the telephone device it is connected to from accessing a common line when another telephone device is already off-hook. The Alderman privacy device also includes a hold circuit for placing callers on hold.

A problem with current privacy circuits is that because they must be connected to the telephone device that they are intended to exclude, they can easily be overridden by a potential eavesdropper without notice to the eavesdropee by disconnecting them from the telephone device that the eavesdropper intends to use.

An example of an alerting device can be seen in U.S. Pat. No. 4,230,914 issued Oct. 28, 1980 to P. Korwin et al., which discloses an alerting device for installation in the hand set of a telephone which provides a visual alarm when a subsequent telephone device on the same telephone line goes off-hook. However, the device disclosed in this patent requires an external power source in the form of a battery, and must be connected to the internal circuitry of the telephone, which makes it impractical.

U.S. Pat. Nos. 4,726,048 and 4,941,166 issued Feb. 16, 1988 and Jul. 10, 1990, respectively, to H. H. Waldman et al. disclose an alerting device which cuts off the audio signal to a first off-hook telephone when a further telephone sharing the same telephone line is subsequently taken off-hook. The alerting device in Waldman et al. operates by cutting off the voice path to the first telephone when the voltage across the telephone line drops below a pre-determined threshold. Such a device is inconvenient as it cuts off the voice path to the first user entirely when a second telephone is off-hook, thereby isolating the first user.

U.S. Pat. No. 4,136,266 issued Jan. 23, 1979 to Cohen et al. discloses an alerting device which detects the fact that an extension telephone has been placed in the off-hook condition by detecting "click" signals which are placed on the telephone line whenever any extension telephone is placed either in the off-hook condition or, if it is already in the off-hook condition, when it is placed in the on-hook condition. The "click" signals are defined in Cohen et al. as having distinctive acoustic and electrical properties which can be detected as a function of the frequency of the signal and the voltage level thereof. The Cohen et al. patent provides complex detection circuitry for detecting these click signals and generates an alarm whenever these signals are detected. The external alarm requires that the device be located where it can be seen/heard by the user.

In order to detect these signals, the privacy circuit of Cohen et al. relies on a tuned detection circuit which must be tuned to the specific frequency of the clicks. Since this frequency will vary from telephone to telephone, it requires a manual adjustment of a variable resistor forming part of the tuned circuit. This manual adjustment must be made by the user of the alerting device for each individual installation.

In addition to the above shortcomings, the existing alerting devices do not have the dual ability to act as privacy devices in that they will not prevent a second telephone device from connecting to the common line when a first telephone device is already off-hook. This is particularly a concern when the second telephone device is a modem or fax which will not respond to the same stimulus that a human eavesdropper would. Also, the existing alerting devices are inconvenient in that they do not include a hold function for allowing an incoming call to be placed on hold.

Thus, it is desirable to provide a single device which can act as both a privacy device and an alerting device. Specifically, it is desirable to provide a privacy and alerting device which, when connected to a first telephone device will prevent that telephone device from going off-hook if another telephone device on a common-telephone line is already off-hook, and which will sound an alarm if the first telephone device alone is off-hook and another telephone device subsequently goes off-hook.

It is also desirable to provide a privacy and alerting device which will allow more than one telephone device to access the common line when desired, and to provide a privacy and alerting device which includes a hold function.

It is also desirable to have an eavesdropping alerting device for a telephone system which does not require an external source of power in addition to the telephone line, which makes use of a circuit which is easily constructed, and which makes use of an audio alarm which can be heard in the ear piece of the off-hook telephone devices without cutting off the voice path.

BRIEF SUMMARY OF THE INVENTION

According to one aspect of the invention, a telephone privacy and alerting device for connection to a telephone line and a telephone device is provided. The device includes a privacy circuit and alerting circuit. The privacy circuit includes a voice connecting circuit for connection between the telephone line and the telephone device, the voice connecting circuit having a self-latching switch means having an on and off state. The privacy circuit also has voltage breakdown means for turning the self-latching switch means on when a closed circuit is provided through the telephone device and the potential across said telephone line is above a first predetermined threshold, thereby allowing the voice connecting circuit to establish a current path between the telephone line and the telephone device.

The alerting circuit is adapted for connection to the telephone line and includes alarm means for generating an alarm signal when the alarm means receives a first triggering signal and a second triggering signal simultaneously, current monitoring means responsive to the voice connecting circuit and operatively coupled to the alarm means for providing the first triggering signal when current is present in the voice connecting circuit, and further voltage breakdown means operatively coupled to the alarm means for providing the second triggering signal when the potential across the telephone line is below a second predetermined threshold.

Preferably, the first predetermined threshold is lower than the potential across the telephone line when all telephone devices connected to the telephone line are on-hook and generally higher than the potential across the telephone line when at least one of the telephone devices connected to the telephone line is off-hook, and the second predetermined threshold is lower than the potential across the telephone line when the telephone device is off-hook and any other telephone devices connected to the telephone line are on-hook and higher than the voltage across the telephone line when the telephone device is off-hook and at least one other telephone device connected to the telephone line is also off-hook.

In one preferred embodiment, the telephone privacy and alerting device included a parallel combination of a shunt switch and a resistor in series with the voice connecting circuit, the magnitude of the resistor being such that when the telephone device is off-hook and the shunt switch is open and no other telephone devices connected to the telephone line are off-hook, the potential across said telephone line will be raised above the first predetermined potential.

In a another preferred embodiment, the telephone privacy and alerting device further comprises a hold circuit for connection to the telephone line for permitting a call to be placed on hold so that the telephone device can be placed on-hook without causing the call on the telephone line to be terminated. The hold circuit may include a voltage breakdown device which passes current only when the voltage across the voltage breakdown device exceeds a predetermined threshold, a self-latching switch device having an on and off state connected in series with the voltage breakdown device, and hold circuit gating means responsive to the shunt switch for turning said self-latching switch means on when the shunt switch is open and the telephone device is off-hook.

According to a further aspect of the invention, a telephone privacy and alerting device for connection between a telephone line and a telephone device is provided which has a first rectifier circuit having two AC terminals and two DC terminals, the AC terminals being adapted for series connection between the telephone line and the telephone device. A voice connecting circuit is connected between the DC terminals of the first rectifier circuit. The voice connecting circuit includes a self-latching switch means having an on and off state. A voltage breakdown circuit is connected to the DC terminals of the first rectifier circuit for turning the self-latching switch means on when the potential across the first rectifier circuit exceeds a first predetermined threshold, thereby causing the voice connecting circuit to establish a current path between the DC terminals of the first rectifier circuit. The telephone privacy and alerting device also includes a second rectifier circuit having two AC terminals and two DC terminals, the AC terminals being adapted for connection across the telephone line. An alarm circuit is connected to the DC terminals of the second rectifier circuit for generating an alarm signal when the alarm circuit receives a first triggering signal and a second triggering circuit simultaneously. A current monitoring circuit responsive to the voice connecting circuit is operatively coupled to the alarm circuit for providing the first triggering signal when current is present in the voice connecting circuit. A further voltage breakdown circuit is operatively coupled to the alarm circuit for providing the second triggering signal when the potential across the telephone line is below a second predetermined threshold.

According to another aspect of the invention, a telephone privacy and alerting device for connection to a common telephone line and one of at least two telephone devices sharing the line is provided. The privacy and alerting device comprises a voice connecting circuit for connection between a respective telephone device and the telephone line, the circuit including a SCR having an on and off state. The device includes means for turning the SCR on when the respective telephone line operated device goes off-hook, provided the voltage across the telephone line exceeds a first predetermined threshold level, thereby permitting the voice connecting circuit to operate. Additionally, the privacy and alerting device comprises an alarm circuit for generating a signal on the telephone line that causes an audio sound to be generated by the ear-piece of the respective telephone line operated device when the alarm circuit receives a first triggering signal and a second triggering signal simultaneously. A current monitoring circuit responsive to the voice connecting circuit is operatively connected to the alarm circuit for providing the first triggering signal when current is present in the voice connecting circuit. A voltage monitoring circuit for connection to the telephone line is operatively connected to the alarm circuit for providing the second triggering signal when the voltage across the telephone line drops below a second predetermined threshold level.

According to still a further aspect of the invention, there is provided an alerting device for connection to a telephone line and a telephone device. The alerting device comprises a voice circuit for series connection between the telephone line and the telephone device, and an alarm circuit for generating a periodic audio signal in the ear-piece of the telephone device when the alarm circuit receives a first triggering signal and a second triggering signal simultaneously. The device includes a current monitoring circuit connected to the voice circuit for detecting the presence of current in the voice circuit. The current monitoring circuit is operatively connected to the alarm circuit for providing the first triggering signal to the alarm circuit when current is present in the voice circuit. The device also includes a voltage monitoring circuit for connection to the telephone line for detecting when the voltage across the telephone line drops below a threshold value. The voltage monitoring circuit is operatively connected to the alarm circuit for providing the second triggering signal to the alarm circuit when the voltage is below the threshold.

The present invention will be understood and appreciated more fully from the following detailed description, taken in conjunction with the accompanying drawings.

DETAILED DESCRIPTION OF THE INVENTION

A. Telephone Alerting Device

Figure 1:
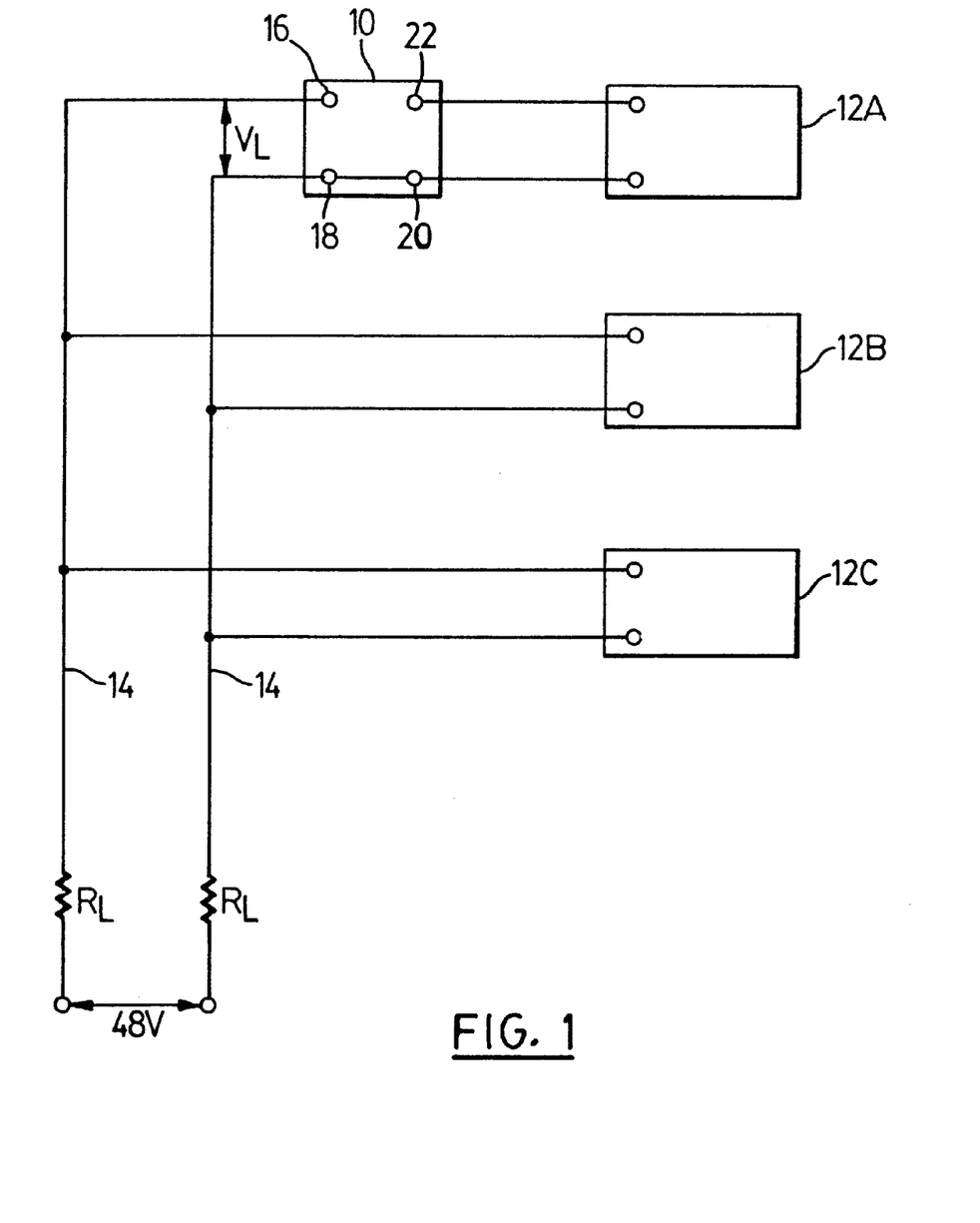
FIG. 1 is a block diagram of the alerting device of the present invention connected in a system of multiple telephone devices which are connected to a common telephone line.

FIG. 1 shows a telephone system in which a plurality of telephone devices 12A, 12B and 12C are attached through a common telephone line 14 to a telephone exchange (not shown). A telephone alerting device 10 of the present invention is coupled between the telephone 12A and the common telephone line 14.

The telephone line 14 is a conventional telephone line which includes tip and ring conductors which have inherent line impedances $R_L$. A DC potential of approximately 48 volts is applied across the telephone line at the telephone exchange.

Figure 2:
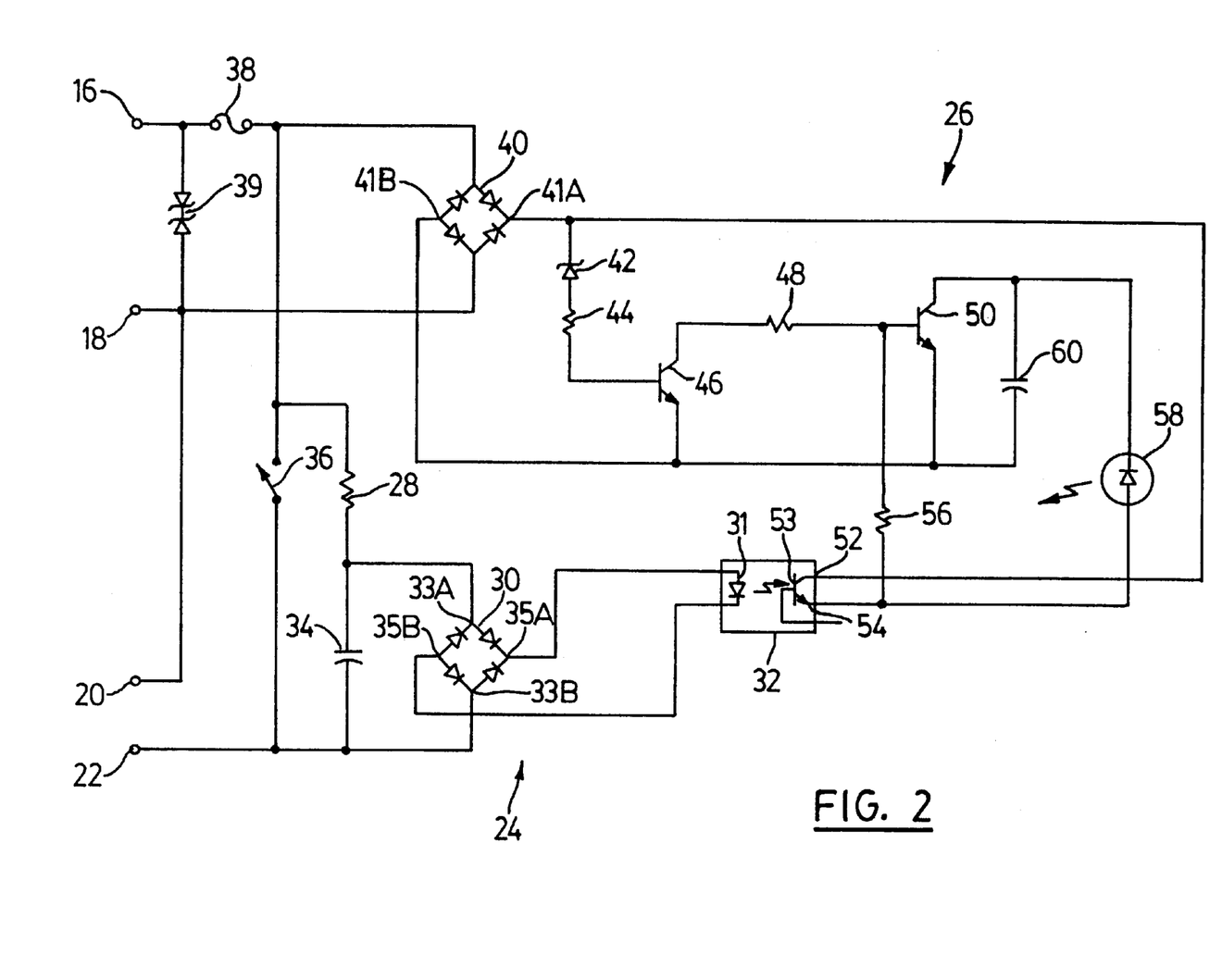
FIG. 2 is a circuit diagram of a preferred embodiment of the circuit of the alerting device.

FIG. 2 is a circuit diagram of a first preferred embodiment of the alerting device 10. Two terminals 16 and 18 are provided for connecting the circuit to the tip and ring conductors of the telephone line 14. The circuit of FIG. 2 can be broken down into two parallel circuits which are attached between the tip and ring terminals 16 and 18, namely a voice circuit, which is indicated generally by 24, and a monitoring circuit, which is indicated generally by 26.

The voice circuit 24 includes two terminals 20 and 22 for attaching a telephone device to the alerting device 10. One phone terminal 20 is connected directly to one phone line terminal 18. Two alternative current paths are provided between the other phone line terminal 16 and the other phone terminal 22. The first current path is provided by a resistor 28, a diode bridge rectifier 30 and the LED 31 of an opto-isolator 32. The resistor 28 is connected between the terminal 16 and one AC junction 33A of the diode bridge 30. The other AC junction 33B of the diode bridge 30 is connected to the terminal 22. The LED 31 of the opto-isolator 32 is connected across the DC junctions 35A and 35B of the diode bridge 30. The diode bridge 30 serves as a polarizing circuit which ensures that current always flows in the correct direction to the LED 31 without concern for the polarization of the telephone line 14.

A capacitor 34 is connected across the AC junctions 33A and 33B of the diode bridge 30 to provide an AC signal path to the telephone device attached between the terminals 16 and 18. The capacitor 34 allows an AC ringing signal (typically 90 volts AC), along with other data such as caller ID data which may be superimposed on the ringing signal, to be provided to a telephone device connected to the terminals 20 and 22. In the preferred embodiment, the capacitor 34 is a 0.47 micro farad capacitor.

The second current path provided between the terminals 16 and 22 comprises a manual switch 36. When closed, the switch 36 provides a direct path between the terminals 16 and 22 thereby allowing the resistor 28, diode bridge 30 and LED 31 to be by-passed. For reasons which will become apparent hereinafter, when the switch 36 is open, the alerting device 10 is in an "enabled" state, and when the switch 36 is closed, the alerting device 10 is in an "disabled" state.

Although not required, a fuse 38 may be included in series with the terminal 16 as a safety feature. In the preferred embodiment, the fuse 38 is a 250 mA fuse. Additionally, an over-voltage protector 39 may be connected between the terminals 16 and 18 if desired.

The monitoring circuit 26 is coupled between the tip and ring terminals 16 and 18 via a diode bridge 40. The diode bridge 40 serves as a polarizing circuit such that current will flow in the same direction through the monitoring circuit 26 regardless of the polarization of the telephone line 14.

The monitoring circuit 26 includes a Zener diode 42, the cathode of which is attached to the positive DC junction 41A of the diode bridge 40, and the anode of which is connected, via a current limiting resistor 44, to the base of a first transistor 46. When the potential across the terminals 16 and 18 exceeds the Zener voltage threshold of the Zener diode 42, the Zener diode 42 will breakdown and conduct current to the base of the first transistor 46. In the preferred embodiment, the Zener diode 42 has a breakdown threshold of 10 volts, although different Zener diodes with different thresholds may be desirable depending on the characteristics of the telephone system the circuit is used in. The current limiting resistor 44 which is placed in series with the Zener diode 42 is of relatively high resistance, preferably around one (1) megohm. The emitter of the first transistor 46 is connected to the negative DC terminal 41B of the diode bridge 40.

In addition to being connected to the Zener diode 42, the DC junction 41A of the diode bridge 40 is also connected to the collector 52 of the phototransistor 53 of the opto-isolator 32. The emitter 54 of the phototransistor 53 is connected, through a further current limiting resistor 56, to the base of a second transistor 50. The base of the second transistor 50 is also connected, via a resistor 48, to the collector of the first transistor 46. The magnitude of the resistor 48 is such that as long as the first transistor 46 is "on", then the potential at the base of the second transistor 50 will be insufficient to turn the second transistor 50 on. In the preferred embodiment the resistor 48 is a 1 kilohm resistor, and the resistor 56 has a resistance of between 270 kilohm and one (1) megohm. The emitter of the second transistor 50 is connected, along with the emitter of the first transistor 46, to the junction 41B of the diode bridge 40.

The monitoring circuit 26 also includes an LED 58 which is connected between the emitter 54 of the phototransistor 53 of the opto-isolator 32 and the collector of the second transistor 50. The LED 58 is preferably a special low current blinking LED. As will be explained in greater detail below, the blinking LED 58 is an alarm device used to signal an alarm state by generating both visible and audible alarms when the phone connected between the terminals 20 and 22 is off-hook and a further phone device connected to the same phone line also goes off-hook.

A capacitor 60 is preferably connected between the collector and emitter of the second transistor 50 in order to increase the stability of the circuit 26 by reducing spurious pulses or oscillations that may occur in the circuit 26. In the preferred embodiment, the capacitor 16 is a 1 micro farad capacitor.

With reference to FIGS. 1 and 2, the operation of a preferred embodiment of the alerting device 10 will now be described. In particular, the operation of the alerting device 10 will be described in three different situations. First, its operation will be described when all of the telephone devices 12A, 12B and 12C that are attached to the common telephone line 14 are on-hook. Next, its operation will be described when only the telephone device 12A is off-hook, and all the other telephone devices attached to the line 14 are on-hook. Finally, the operation of the alerting device 10 will be described when the telephone device 12A is off-hook and a further telephone device 12B or 12C is also off-hook.

When all of the telephone devices attached to the common telephone line 14 are in an on-hook state, the alerting device 10 is in a "standby-state". The normal on-hook line voltage of a typical telephone line is equal to the DC voltage applied to the line at the telephone exchange, generally around 48 volts DC. Thus, the line voltage $V_L$ between the tip and ring terminals 16 and 18 will generally be around 48 volts DC when the alerting device 10 is in its standby-state. When the telephone 12A is on-hook, no current path is provided between the terminals 20 and 22 with result that there is no current flow through the voice circuit 24.

In the monitoring circuit 26 the potential between the DC junctions 41A and 41B of the diode bridge 40 is equal to the potential $V_L$ between the tip and ring terminals 16 and 18, which, as described above, is around 48 volts DC when all the phone devices are on-hook. Because there is no current flow in the voice circuit 24 when the phone 12A is on-hook, the LED 31 of the opto-isolator 32 remains inactive, and so the phototransistor 53 stays in an off-state and no current is transmitted between its collector 52 and emitter 54. As a result, no potential exists at the anode of the blinking LED 58 or at the base of the second transistor 50, and so no current flows through the LED 58, regardless of the state of the first transistor 46. The first transistor 46 will actually be in an on-state when the line potential $V_L$ at the terminals 16 and 18 is 48 volts, as the Zener breakdown voltage of the Zener diode 42 is less than 48 volts. The high resistance of the current limiting resistor 44 ensures that the monitoring circuit 26 has a high DC impedance (of at least one (1) megohm) when it is in a standby-state, which keeps the current draw of the monitoring circuit 26 at negligible levels and ensures the alerting device 10 is in compliance with FCC requirements.

The operation of the circuit of FIG. 2 will now be considered in the situation where the telephone 12A connected between the terminals 20 and 22 is taken off-hook, and the remaining telephone devices 12B and 12C connected to the common telephone line 14 remain on-hook. When the telephone 12A is taken off-hook, a circuit path between the terminals 20 and 22 is completed, and current begins to flow through the voice circuit 24. Provided that the manual switch 36 is in an open position (i.e., if the alerting device 10 is enabled) then current will flow through a path provided by the resistor 28, the diode bridge 30 and the LED 31 of the opto-isolator 32. The 48 volts DC potential applied across the telephone line at the telephone exchange will be divided between the line impedances $R_L$ and the total impedance of the circuit connected between the terminals 16 and 18. The impedance of the circuit connected between the terminal 16 and 18 is approximately the equivalent of the series combination of the resistor 28 and the internal impedance of the telephone 12A. (Because of the high resistance value of the resistor 44, the monitoring circuit 26 has a negligible affect on the total impedance of the circuit connected between the terminal 16 and 18 when the Zener diode 42 is reverse biased.)

In the preferred embodiment, when the telephone 12A is off-hook and the other telephone devices are on-hook, the voltage drop $V_L$ across the tip and ring terminals 16 and 18 will typically be in the range of $V_L$=10 to 16 volts, depending on the actual characteristics of the telephone line 14 and the telephone 12A. It will be appreciated by those skilled in the art that the presence of the current-limiting resistor 28 in series with the telephone 12A drives the line voltage $V_L$ across the terminals 16 and 18 higher than it would be if the telephone 12A was connected directly to the telephone line 14. For example, if the telephone 12A was connected directly to the telephone line 14, the voltage drop across the telephone 12A would nominally be about 6 volts (and typically in the range of 5 to 12 volts). In the preferred embodiment of FIG. 2, the resistor 28 is a 200 ohm resistor, although different values of resistors could be used depending on the characteristics of the line impedance $R_L$ and the telephone device 12A. As will be described in greater detail below, the resistor 28 can be replaced with a potentiometer.

Turning now to the monitoring circuit 26, when the telephone 12A alone is off-hook, the Zener diode 42 will supply current to the base of the first transistor 46 because the line voltage $V_L$ across the tip and ring terminals 16 and 18 will be in the approximate range of 10V to 16V, which is greater than the threshold voltage of the Zener diode 42. The flow of current through the voice circuit 24 causes the LED 31 of the opto-isolator 32 to place the phototransistor 53 in an on-state such that a current path is provided from the junction 41A of the diode bridge 40 to the base of the second transistor 50 and the anode of the blinking LED 58. However, as long as the first transistor 46 is in an on-state, the potential at the base of the second transistor 50 will be insufficient to place that transistor in an on-state, with the result that current will not be able to flow through the blinking LED 58 and the monitoring circuit 26 will not indicate an alarm state.

The situation will now be considered where the telephone 12A is in an off-hook state and a second telephone device 12B or 12C is also off-hook. When a second telephone device goes off-hook in addition to the telephone 12A, the line voltage $V_L$ between the terminals 16 and 18 will drop significantly because the combination of the alerting device 10 and the telephone 12A in parallel with a further telephone device 12B or 12C results in an overall lower impedance, and thus a greater proportion of the 48 volt drop in the system is attributed to the line impedances $R_L$. Typically, the line voltage $V_L$ across the terminals 16 and 18 will drop down to around 3 to 6 volts when more than one telephone device on the line 14 is off-hook, which is lower than the Zener threshold voltage of the Zener diode 42. As a result, the Zener diode 42 ceases conducting current to the base of the first transistor 46, which places the first transistor 46 in an off-state. The loss of a current path through the first transistor 46 causes an increase in the potential at the base of the second transistor 50 which is sufficient enough to place the second transistor 50 in an on-state, which in turn provides a path for current to flow through the blinking LED 58. As explained above the LED 58 is a special low current blinking diode which blinks on and off intermittently when current is supplied to it, thus providing an active visual alarm to the user of the telephone 12A that a further telephone device has been taken off-hook.

The blinking action of the LED 58 is a result of an internal capacitor in the LED 58 which is continually charging and discharging when current is supplied to it. Although the current flowing through the monitoring circuit 26 is quite small because the LED 58 is a low current LED and the value of the resistor 56 is relatively large, the change in current caused by the cyclic charging and discharging of the internal capacitor in the LED 58 is significant enough to affect the voice signal on the telephone line 14 by causing a periodic audible "click" to occur in the earpieces of all off-hook phone devices attached to the telephone line 14, and also in the ear piece of the phone device on the other side of the telephone exchange. In other words, the small current draw by the blinking LED 58 is sufficient enough to momentarily cause a small drop in the current in the voice circuit 24 and the telephone line 14. The "click" coincides with the blinking of the LED 58, and each "click" is of such a short duration and limited volume that, although audible, the "clicks" will generally not block out the voice signals being transmitted on the telephone line 14. Thus, the circuit of FIG. 2 provides an audio alarm in addition to a visual alarm. Furthermore, as the audio alarm can be heard in the ear-pieces of all off-hook telephones, including the phone on the other side of the telephone exchange, all participants are aware that a potential eavesdropper is on the line, and that the eavesdropper has been detected. Additionally, the audio alarm and visual alarms are powered by the telephone-line without requiring an additional external source of power.

As explained above, the circuit of FIG. 2 includes a manual enabling/disabling switch 36. When the switch 36 is open the circuit operates in the manner described above. However, when the switch 36 is closed a current path is provided directly between the terminal 16 and 22 thereby allowing current to bypass the resistor 28, the diode bridge 30 and LED 31 of the voice circuit 24. As a result, the monitoring circuit 26 is effectively disabled as the phototransistor 53 will not conduct between its emitter 52 and collector 54 as long as no current passes through the LED 31. Thus, a user who wants to temporarily disable the alerting function of device 10 can do so by closing the switch 36.

From the above description, it will be apparent that the opto-isolator 32 couples the voice circuit 24 and the monitoring circuit 26 such that when no current flows through the diode bridge 30 and the LED 31 of the voice circuit 24, the monitoring circuit 26 will not be able to activate the blinking LED 58. Current will not flow through the diode bridge 30 and the LED 31 if the switch 36 is closed, or if the telephone 12A is on-hook. The fact that the alerting function of the monitoring circuit 26 is effectively disabled when the phone 12A is on-hook ensures that the circuit 26 will not be triggered by other phone devices 12B or 12C going off-hook (either alone or together) when the phone 12A is on-hook.

In effect, when enabled, the circuit of FIG. 2 monitors whether current is passing through the telephone 12A and whether the line voltage $V_L$ across the telephone line 14 drops below a threshold value. The LED 31 of the voice circuit 24 indicates when current is passing through the telephone 12A, and the Zener diode 42 indicates (by blocking current) when the voltage across the telephone line 14 has dropped below the threshold value. If current is passing through the telephone 12A (which occurs when the telephone 12A is off-hook) and the line voltage $V_L$ drops below the threshold value (which occurs when telephone devices 12B or 12C go off-hook) at the same time, then the circuit of FIG. 2 generates an alarm by providing current to the blinking LED 58 in the manner described above.

It will thus be appreciated that the circuit of FIG. 2 provides an eavesdropping alarm which only needs to be attached to one telephone on a common line and which generates a visual alarm and also an audio alarm when another telephone device on the common line is off-hook. The audio alarm is heard in the ear-pieces of all off-hook phones, however it does not cut off the user of the first telephone. Furthermore, the circuit of FIG. 2 is relatively cheap and easy to construct and does not require an external power source other than the telephone line.

The resistor 28 of the voice circuit 24 that is placed in series with the telephone 12A is an important aspect of the invention as it ensures that a significant change in the line voltage $V_L$ occurs between the situation where the telephone 12A is the only off-hook device on the telephone line 14 and the situation where the telephone 12A and other telephone devices 12B and/or 12C are also off-hook. The significant change in line voltage between these two situations permits the construction of a robust and accurate alerting device 10 which can be used in a variety of telephone systems with differing characteristics.

Figure 3:
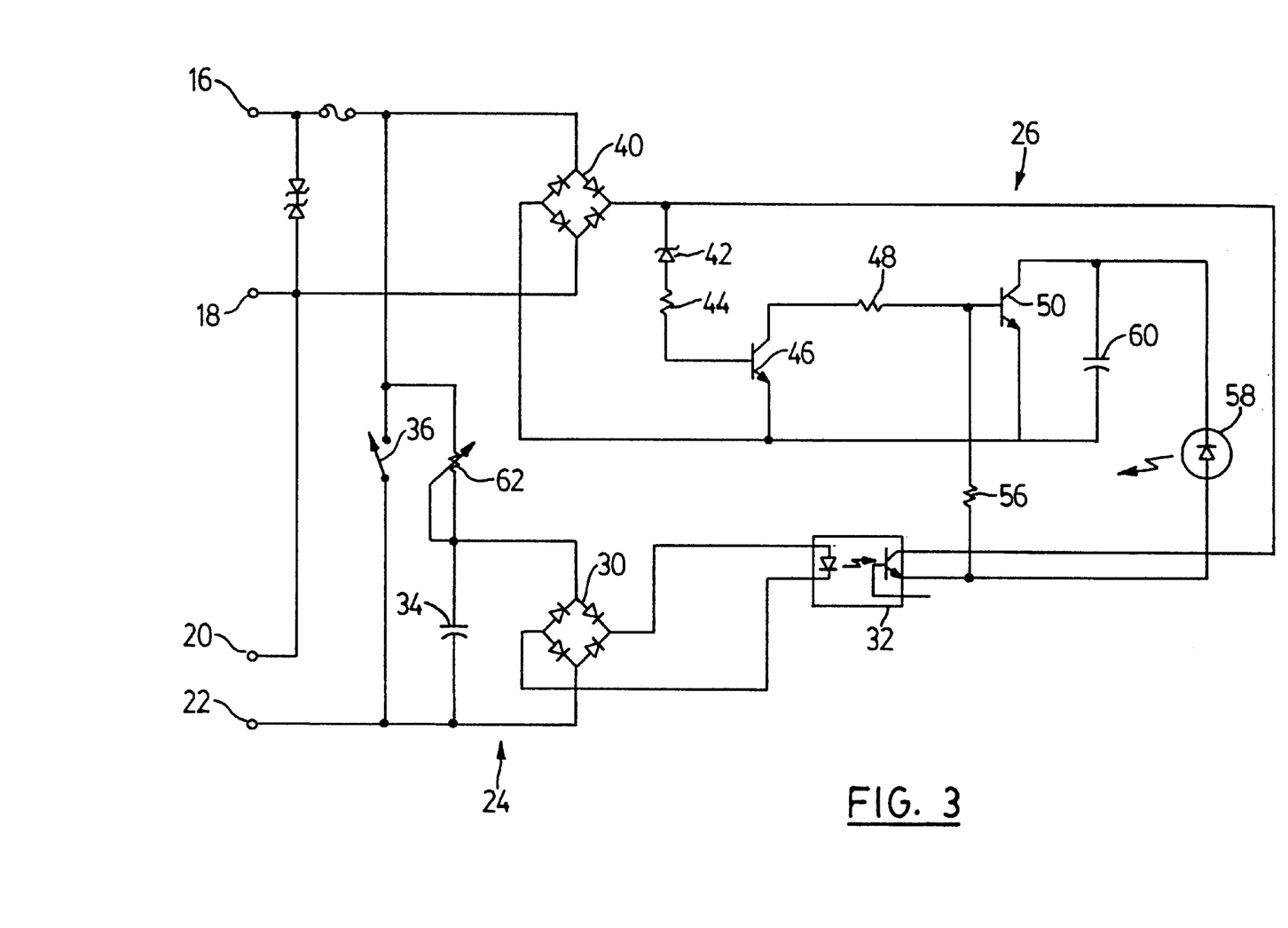
FIG. 3 is a circuit diagram of another preferred embodiment of the circuit of the alerting device.

Although the circuit of FIG. 2 will function well in most telephone systems, it is possible that in some phone systems the telephone line impedances and the characteristics of the phone devices attached to the phone line will require that a different value be used for the resistor 28. FIG. 3 illustrates a second preferred embodiment of the circuit of the alerting device 10. The circuit of FIG. 3 is identical in function and structure to the circuit of FIG. 2 described above except that the resistor 28 has been replaced with a potentiometer 62. The potentiometer 62 is preferably adjustable from 0 to 500 ohms and permits the circuit of FIG. 3 to be easily adjusted for use with a wide range of telephone systems with differing characteristics.

Figure 4:
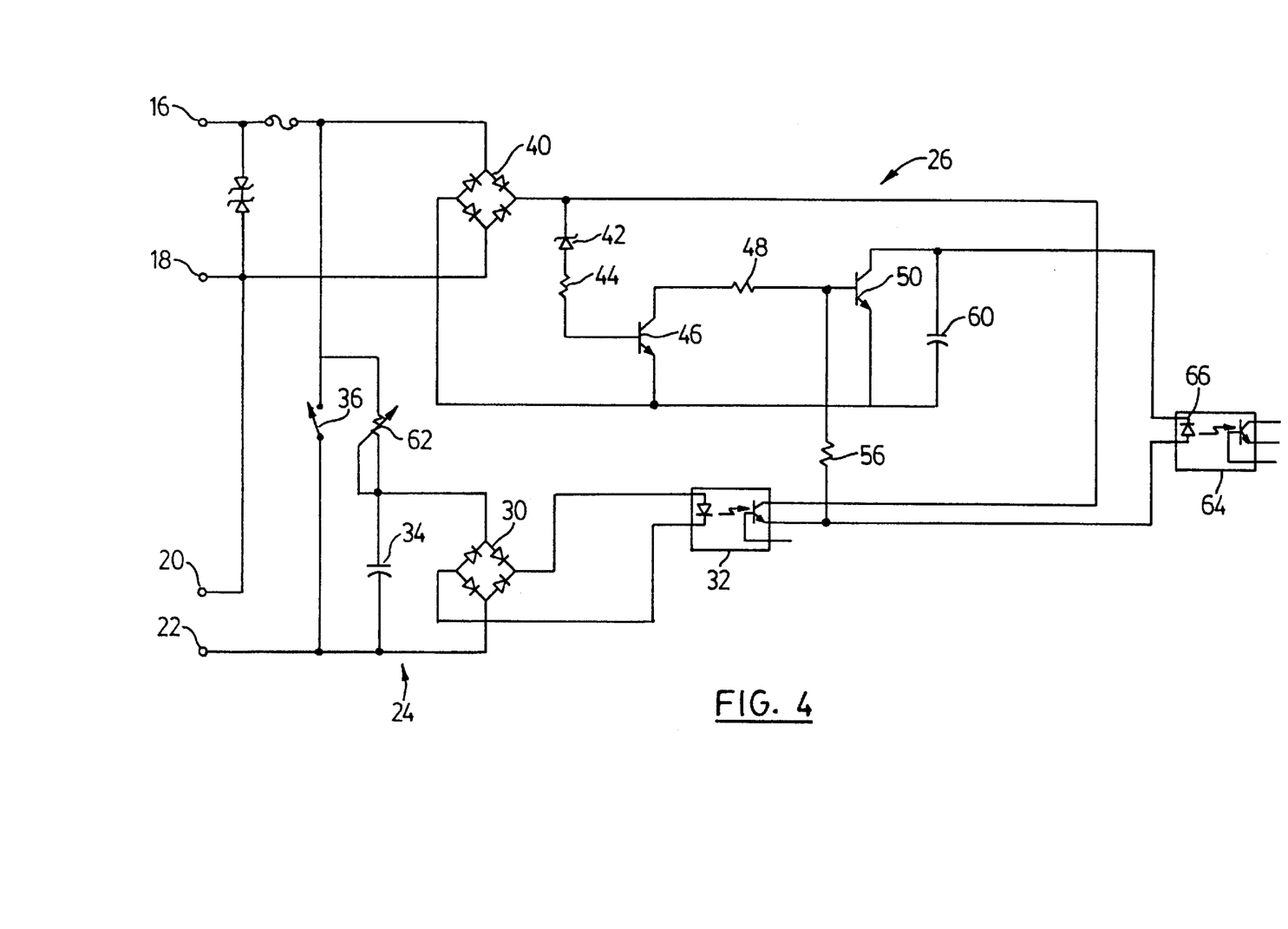
FIG. 4 is a circuit diagram of a further preferred embodiment of the circuit of the alerting device.

Although a blinking LED is used in the circuits of FIG. 2 and FIG. 3 as the alarm means for indicating that a second phone is off-hook, it will be appreciated that the blinking LED 58 could be replaced with some other alarm indicating means. For example, with reference to FIG. 4, the blinking LED could be replaced with an opto-isolator, which in turn could be used to drive an alarm device such as an external audio buzzer (not shown). The embodiment of the invention illustrated in FIG. 4 is identical in both structure and function to the circuit of FIG. 3, except that the blinking LED 58 has been replaced with an LED 66 of an opto-isolator 64.

The alerting device 10 can be produced and sold as a stand alone device that can be attached between a telephone device and a telephone jack, or it can be produced and sold integrally combined with a telephone device.

B. Telephone Privacy and Altering Device

Although the alerting device 10 described above will sound an alarm when a further telephone device goes off-hook in addition to the telephone device to which the alerting device 10 is connected, it does not act as a privacy device in that it cannot prevent a telephone device from going off-hook when another telephone device on a common line is already off-hook. This is particularly a concern when the intruding telephone device is a fax, modem, or other automated transfer device which will not respond to the alarm signal generated by the alerting device 10, or to being politely asked to get off the line. This shortcoming is overcome by a further aspect of the invention which provides a combined telephone privacy and alerting device.

Figure 5:
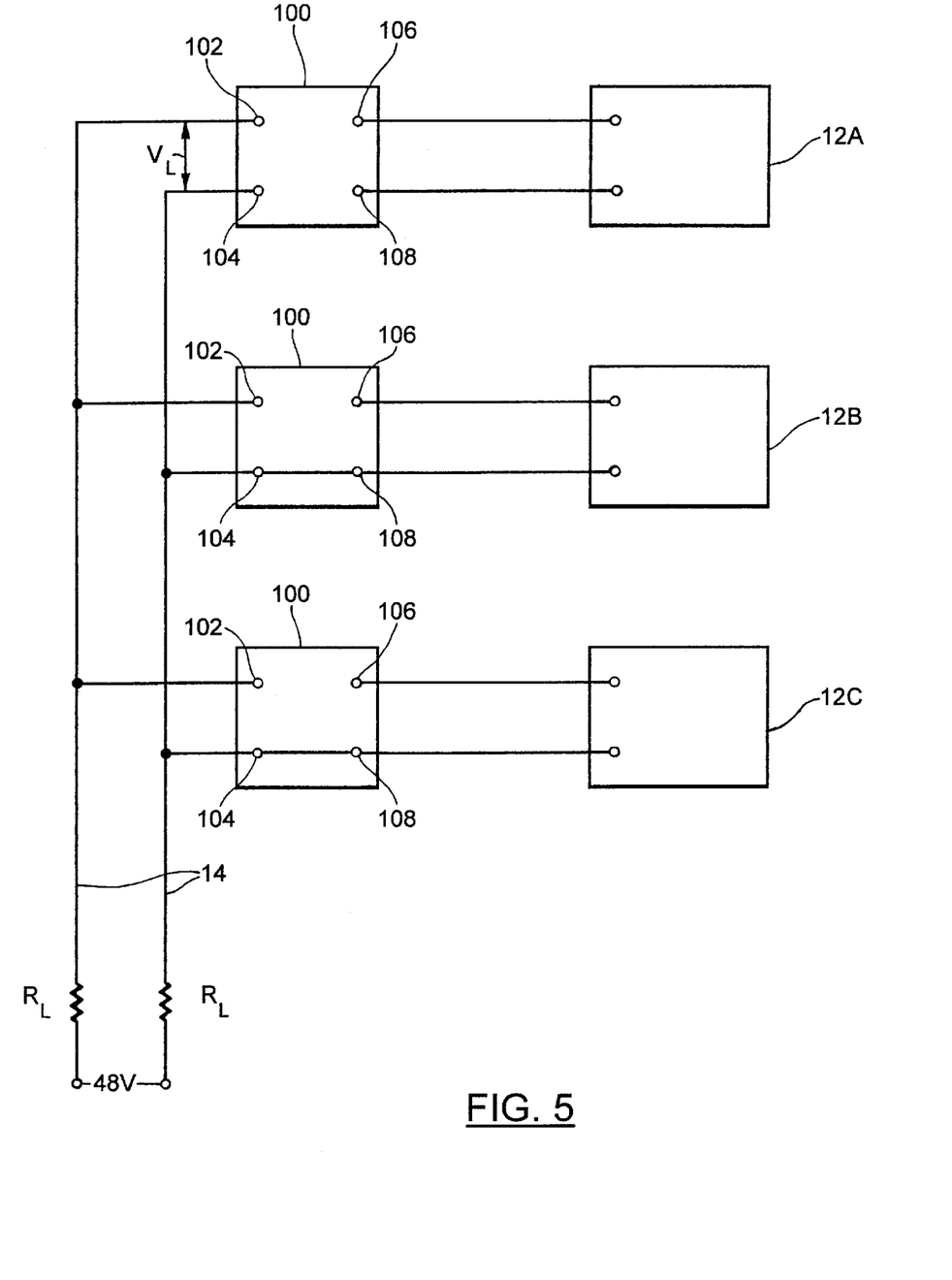
FIG. 5 is a block diagram of privacy and alerting devices of the present invention connected in a system of multiple telephone devices which are connected to a common telephone line.

With reference to FIG. 5, a privacy and alerting device 100 of the present invention is coupled between each of the telephone devices 12A, 12B and 12C and the common telephone line 14. Each privacy and alerting device 100 has two terminals 102 and 104 for connection to the tip and ring conductors of the telephone line 14, and two terminals 106 and 108 for connection to a telephone device.

Figure 6:
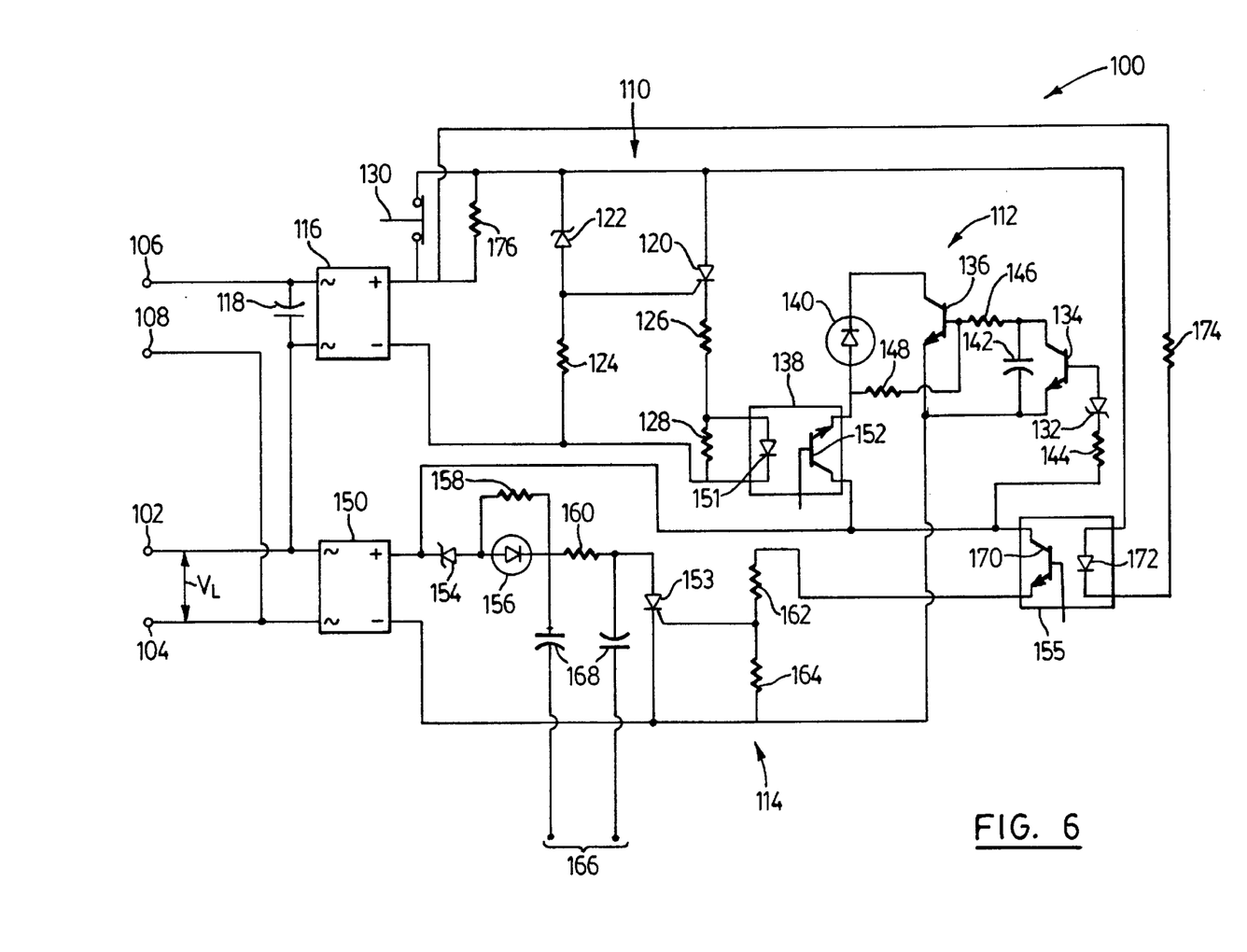
FIG. 6 is a circuit diagram of a preferred embodiment of the circuit of the privacy and alerting device.

Referring to FIG. 6, the privacy and alerting device 100 can generally be broken down into three sections or circuits, namely a privacy circuit indicated generally by 110, an alerting circuit, indicated generally by 112, and a hold circuit indicated generally by 114. As will be explained in greater detail below, the privacy circuit 110 allows a voice or data path to be established between the telephone device that the privacy and alerting device 100 is connected to and the telephone line 14 only when the line voltage $V_L$ is above a pre-determined threshold.

The alerting circuit 112, which is similar to the previously described monitoring circuit 26, will generate an alarm when the telephone to which the privacy and alerting device 100 is connected is off-hook at the same time that another telephone device is off-hook and electrically connected to the telephone line 14.

The hold circuit 114 allows a call on the telephone line 14 to be placed on hold so that the telephone device to which the privacy and alerting device 100 is connected can be placed on-hook without causing the central exchange to disconnect the telephone call. In this respect, when activated the hold circuit maintains a voltage across the telephone line 14 which is low enough to prevent the telephone exchange from interpreting the line condition as a hang-up, but high enough to allow the privacy circuit 110 to establish a voice path when a telephone device is subsequently taken off-hook.

The preferred design of the telephone privacy and alerting device 100 and will now be described in greater detail. The device 100 preferably includes a first bridge rectifier circuit 116, the AC terminals of which are coupled in series between the telephone line terminal 102 and the telephone device terminal 106, and a second bridge rectifier circuit 150, the AC terminals of which are coupled across the telephone tip and ring terminals 102 and 104. In a manner well known in the art, the bridge rectifier circuits 116 and 150 (which each may be contained on a single integrated chip) serve as polarizing circuits to ensure that current flows in the correct direction through the circuitry of the privacy and alerting device 100 regardless of the polarity of the conductors of the telephone line 14.

The telephone line terminal 104 of the device 100 is connected directly to the telephone device terminal 108. A capacitor 118 is connected across the AC terminals of the first bridge rectifier 116 to provide an AC signal path to the telephone device attached to the telephone terminals 106 and 108. The capacitor 118 permits an AC ringing signal, along with other data such as caller ID information which may be superimposed on the ringing signal, to by-pass the first bridge rectifier 116.

The privacy circuit 110 preferably includes a silicon controlled rectifier (SCR) 120, a zener diode 122, and resistors 124 and 126. As will be explained in greater detail below, a parallel combination of a resistor 128 and an LED 151 of an opto-isolator 138 are used to optically link the privacy circuit 110 and the alerting circuit 112. The cathode of the zener diode 122 and the anode of the SCR 120 are each connected, through the parallel combination of a resistor 176 and a normally closed shunt switch 130, to the positive DC terminal of the first bridge rectifier 116. The anode of the zener diode 122 is connected through the resistor 124 to the negative DC terminal of the first bridge rectifier 116. The anode of the zener diode 122 is also operatively connected to the gate of the SCR 120. The cathode of the SCR 120 is connected through the resistor 126, and through the parallel combination of the resistor 128 and the LED 151, to the negative DC terminal of the bridge rectifier 116.

The SCR 120, the resistor 126, and the parallel combination of the resistor 128 and LED 151 provide a voice connecting circuit for establishing a voice path between the telephone line terminal 102 and the telephone device terminal 106 when the gate of the SCR 120 receives a triggering signal as a result of the breakdown of the zener diode 122 which will occur when the telephone device provides a current path between the terminals 106 and 108 and the potential across the zener diode 122 exceeds its threshold. The breakdown threshold voltage of the zener diode 122 is selected to be less than the normal line voltage $V_L$ when all of the telephone devices connected to the line 14 are on-hook, but greater than the normal line voltage when at least one telephone device connected to the line 14 is off-hook. In one preferred embodiment, the zener breakdown voltage of the zener diode 122 is 20 volts. The SCR 120 functions as a self-latching switch and, once triggered, will continue conducting until it becomes current starved.

The alerting circuit 112 is very similar to the monitoring circuit 26 described earlier. The alerting circuit 112 preferably includes a zener diode 132, a first transistor 134, a second transistor 136, a phototransistor 152 of the opto-isolator 138, an LED 140, a capacitor 142, and three resistors 144, 146 and 148. The alerting circuit 112 is coupled between the tip and ring terminals 102 and 104 of the telephone privacy and alerting device 100 through the second diode bridge rectifier circuit 150. The cathode of the zener diode 132 is connected, through the resistor 144, to the positive DC terminal of the second diode bridge rectifier 150, and the anode of the zener diode 132 is connected to the base of the first transistor 134. When the potential across the terminals 102 and 104 exceeds the zener voltage breakdown threshold of the zener diode 132, the zener diode 132 will breakdown and conduct current to the base of the first transistor 134. In the preferred embodiment, the breakdown voltage of the zener diode 132 is less than the line voltage $V_L$ when the telephone device to which the device 100 is connected is off-hook alone, but greater than the line voltage $V_L$ when an additional telephone device is off-hook. In one preferred embodiment, the threshold voltage of the zener diode 132 is 10 volts.

The collector of the photo-transistor 152 of the opto-isolator 138 is connected to the positive DC terminal of the diode bridge 150, and the emitter of the photo-transistor 152 is connected through the resistor 148 to the base of the second transistor 136. The base of the second transistor 136 is also connected, via the resistor 146 to the collector of the first transistor 134. The magnitude of the resistor 146 is such that as long as the first transistor 134 is "on", then the potential at the base of the second transistor 136 will be insufficient to turn the second transistor 136 on, regardless of whether the photo-transistor 152 is activated. The emitters of the second transistor 136 and the first transistor 134 are each connected to the negative DC terminal of the bridge rectifier 150. The LED 140 of the alerting circuit 112 is connected between the emitter of the photo-transistor 152 of the opto-isolator 138 and the collector of the second transistor 136. The LED 140 is preferably a low current blinking LED which will blink on and off intermittently when current is supplied to it, thus indicating an alarm. The capacitor 142 is preferably connected across the collector and emitter of the first transistor 134 in order to increase the stability of the alerting circuit 112 by reducing spurious pulses or oscillations that may occur in the circuit 112.

Current will be provided to the blinking diode 140 when the first transistor 134 is in an off-state and the second transistor 136 is in an on-state. This will only happen when the line voltage $V_L$ is below the threshold of the zener diode 132 at the same time that the photo-transistor 152 is activated by the LED 151. The LED 151 will only activate the photo-transistor 152 when current is passing through the SCR 120 of the privacy circuit 110.

Thus, the alerting circuit 112 effectively provides an alarm circuit which will indicate an alarm state only when it receives two simultaneous triggers. One of the triggers is provided by the zener diode 132 by blocking current to the base of the first transistor 134 when the line potential $V_L$ drops below the threshold of the zener diode 132. The other trigger is provided by the photo transistor 152 of the opto-isolator 138, (which is turned on by the LED 151 when current is present through the voice connecting circuit portion of privacy circuit 110 ) which is connected to the base of the second transistor 136. Linking the alerting circuit 112 to the privacy circuit 110 ensures that the alerting circuit 112 will not indicate an alarm state when the telephone to which it is connected is on-hook. The resistors 144 and 148 of the alerting circuit 112 preferably have a relatively high value so that the alerting circuit 112 will have a high DC impedance when it is not indicating an alarm state, thus minimizing its effect on the telephone system.

The hold circuit 114 preferably includes an SCR 153, a zener diode 154, an opto-isolator 155, an LED 156, four resistors 158, 160, 162 and 164, lead lines 166 for connection to an external audio source, and capacitors 168 in the lead lines 166.

The hold circuit 114 is coupled in parallel with the alerting circuit 112 across the tip and ring terminals 102 and 104 by means of the second diode bridge 150. The cathode of the zener diode 154 is connected to the positive DC terminal of the second diode bridge 150, and the anode of the zener diode 154 is connected to the anode of the LED 156. The cathode of the LED 156 is connected through the resistor 160 to the anode of the SCR 153. The cathode of the SCR is connected to the negative DC terminal of the diode bridge 150. The resistor 158 is connected in parallel with the LED 156. The zener diode 154, the parallel combination of the LED 156 and the resistor 158, the resistor 160 and the SCR 153 define a hold path circuit which, when activated, permits incoming calls to be placed on hold. The zener diode 154 preferably has a breakdown threshold of between 12V to 20V.

The gate of the SCR 153 is connected through the resistor 162 to the emitter of the photo-transistor 170 of the opto-isolator 155, and through the resistor 164 to the negative DC terminal of the bridge rectifier 150. The collector of the photo-transistor 170 is connected to the positive DC terminal of the diode bridge 150. The normally closed switch 130 and the resistor 176 are optically linked to the hold circuit 114 by the opto-isolator 155 in that a resistor 174 is located in series with the LED 172 of the opto-isolator 155, and this series combination is connected in parallel with the normally closed switch 130 and in parallel with the resistor 176.

Audio input lines 166 are connected across the resistor 160 so that, if desired, a radio or other audio input can be connected to the hold circuit 114 to provide background music on the telephone line 14 when the hold circuit 114 is activated. When the hold circuit 114 is inactive, it is substantially an open circuit across the telephone terminals 102 and 104.

With reference to FIGS. 5 and 6, the operation of the preferred embodiment of the alerting and privacy device 100 will now be described. When all the telephone devices 12A, 12B an 12C on the common line are on-hook (and no calls are on hold) the line voltage $V_L$ will typically be approximately equal to the DC voltage applied to the line at the telephone exchange—generally around 48 volts DC (depending upon the exchange). With reference to the telephone privacy and alerting device 100 connected to any one of the telephone devices 12A, 12B or 12C, no current path will be provided between the telephone terminals 106 and 108, and so no potential will be applied across the first diode bridge 116 of the privacy circuit 110. Thus, the privacy circuit 110 will be inactive.

Turning now to the alerting circuit 112, when all the telephone devices are on-hook, the potential across the DC terminals of the second diode bridge 150 will generally be equal to the line voltage $V_L$, which is approximately 48 volts DC. Thus, a 48 volt DC potential exists across the alerting circuit 112. As no current is present in the privacy circuit 110, the LED 151 of the opto-isolator 138 will not activate the photo-transistor 152 and so no potential will exist at the anode of the blinking LED 140 or at the base of the second transistor 136, and current will therefore not be provided to the blinking LED 140 regardless of the state of the first transistor 134. The breakdown voltage of the zener diode 132 is selected to be lower than the on-hook line voltage of 48 volts, so it will be reverse biased and the first transistor 134 of the alerting circuit 112 will be in an on-state. As the resistor 144 has a relatively high resistance, the alerting circuit 112 provides a high DC impedance (preferably of at least 1 megohm) when the telephone privacy and alerting device 100 is in a stand-by state, thus keeping the current draw of the device 100 at negligible levels in such stand-by state.

Turning now to the hold circuit 114, when all the telephone devices are on-hook and no call is on hold, the on-hook line voltage $V_L$ will be greater than the breakdown voltage of the zener diode 154. However, because there is no potential at the DC terminal of the first diode bridge 116, no potential exists across either the normally closed switch 130 or the resistor 176, with the result that the LED 172 of the opto-isolator 155 remains inactive. Thus, the photo-transistor 170 acts as an open circuit, and no triggering signal will be provided to the base of the SCR 153, and the hold circuit 114 appears as an open circuit.

The operation of the alerting and privacy device 100 will now be described in the situation where only one of the telephone devices connected to the common telephone line goes off hook. By way of example, the operation of the device 100 which is connected to the telephone 12A will now be described in the situation where the telephone device 12A goes off-hook, but the telephone devices 12B and 12C remain on-hook.

Turning to the privacy circuit 110, as soon as the telephone device 12A is taken off of its receiver, a current path between the telephone terminals 106 and 108 is completed which places a DC potential at the cathode of the zener diode 122 and the anode of the SCR 120 of the voice circuit 110. The SCR 120, which is initially in an off state, is unable to conduct current and so momentarily substantially all of the on-hook potential of the telephone line exists across the zener diode 122. As the breakdown voltage of the zener diode 122 is significantly lower than the on-hook line voltage, the zener diode 122 breaks down and provides a triggering signal to the gate of the SCR 120, which causes the SCR 120 to turn on and start conducting. This establishes a voice (or data) path between the telephone device 12A and the telephone line 14.

Once a voice path is established through the privacy circuit 110, the 48 volt DC potential applied across the telephone line at the telephone exchange will substantially be divided between the line impedance $R_L$ and the total impedance of the circuit connected between the terminals 102 and 104. As the alerting circuit 112 and the hold circuit 114 each have a high impedance when they are inactive, the normal impedance of the circuit connected between the terminals 102 and 104 is approximately the equivalent of the impedance across the privacy circuit 110 plus the internal impedance of the phone device 12A. Once the voice path is established, the potential across the zener diode 122 will generally be lower than its threshold value, and so the impedance of the privacy circuit 110 will be approximately equal to the impedance of the resistor 126 (plus any impedance of the SCR 120 and the parallel combination of the LED 151 and resistor 128). The presence of the resistor 126 in series with the telephone device 12A drives the line voltage $V_L$ across the terminals 102 and 104 higher than it would be if the telephone 12A were connected directly to the telephone line 14. In the preferred embodiment, the line voltage $V_L$ will be over 10 volts but less than 12 volts when only the telephone device 12A is off-hook. (In the absence of the device 100, the line voltage $V_L$ would normally be approximately 6 to 8 volts DC).

Turning now to the alerting circuit 112, when the telephone 12A alone is off-hook, the potential applied to the zener diode 132 will be greater than its threshold value (which is 10 volts in the preferred embodiment), and so the zener diode 132 will supply current to the base of the first transistor 134. As the privacy circuit 110 is optically linked through the opto-isolator 138 to the alerting circuit 112, the flow of current through the voice connecting circuit of the privacy circuit 110 results in activation of the LED 151, which in turns places the photo-transistor 152 in an on-state such that a current path is provided from the positive DC terminal of the second diode bridge 150 to the base of the second transistor 136 and the anode of the blinking LED 140. However, as long as the first transistor 134 is in an on-state the potential at the base of the second transistor 136 will be insufficient to place that transistor in an on-state, with the result that current will not be able to flow through the blinking LED 140 and the alerting circuit 112 will therefore not indicate an alarm state.

Turning now to the operation of the hold circuit 114 when the telephone 12A alone is off-hook, as long as the normally closed switch 130 remains closed the potential across the LED 172 of the opto-isolator 155 remains zero with the result that no triggering signal will be applied to the gate of the SCR 153 and so the hold circuit 114 will remain inactive.

If, while the telephone device 12A alone is off-hook, an attempt is made to take an additional telephone device off-hook (for example telephone device 12B) the potential across the zener diode 122 of the telephone privacy and alerting device 100 which is connected to the further telephone device (telephone 12B in the present example) will be less than the threshold voltage of the zener diode 122 (as mentioned above, the line voltage $V_L$, will preferably be above 10 volts and below 12 volts when the telephone device 12A alone is off-hook), and thus no triggering signal will be provided to the SCR 120 of the device 100 connected to the telephone device 12B. As a result, no voice path will be established between the telephone device 12B and the telephone line 14, thus ensuring that the telephone device 12B cannot eavesdrop or otherwise interfere with the conversation or data transfer occurring on the common line 14. In such a situation, the alerting circuit 112 of the privacy and alerting device 100 connected to the off-hook telephone 12A will not indicate an alarm state because the line voltage $V_L$ will not drop below the voltage threshold of the zener diode 132 as the telephone device 12B would never actually go off-hook. Thus, it will be appreciated that the privacy and alerting device 100 can prevent the telephone to which it is connected from accessing a common telephone line when another phone-device is already off-hook.

In a situation where the telephone 12A alone is in an off-hook state and engaged in a call, the user of the telephone 12A may place the call on hold by first opening the normally closed switch 130, and then subsequently hanging up the telephone device 12A. Operation of the switch 130 opens the short circuit which has shunted the resistor 176, thereby serially combining the resistor 176 with the voice path defined by the privacy circuit 110. The presence of the resistor 176 in the voice path has two effects. First of all it increases the series impedance of the voice path, which drives the line voltage $V_L$ up above its value when the switch 130 is closed. In fact, it drives the line voltage $V_L$ up over the threshold value of the zener diode 154 in the hold circuit 114. Secondly, the presence of current in the resistor 176 results in a potential across the LED 172 of the opto-isolator 155 which turns the photo-transistor 170 on, thus placing a triggering signal on the gate of the self-latching SCR 153 and turning the SCR 153 on. This turning on of the SCR 153, combined with the fact that the line voltage $V_L$ is greater than the threshold voltage of the zener diode 154, causes current to begin flowing through the hold circuit 114. Once the hold current path has been established, the phone device 12A can be placed on its receiver and the switch 130 returned to its normal closed state and current will continue to flow through the hold circuit 114 until the line voltage $V_L$ drops below the threshold of the zener diode 154 (which won't occur until a telephone device goes off-hook). As long as current is flowing through the current path defined by the hold circuit 114 the LED 156 will be on, thereby indicating that a call is on hold. In the preferred embodiment, the voltage across the hold circuit 114 during a hold condition is approximately 20–35 volts, which is low enough that the telephone exchange will not conclude that the line 14 is on-hook, but higher than the breakdown threshold of the zener diodes 122 of any of the privacy and alerting circuits connected to the line 14. Thus, it will be understood that any of the telephone devices 12A, 12B or 12C will be able to access the held call on line 14 when the telephone line 14 is in a hold state. This permits a call answered on one telephone device to be easily transferred to one of the other telephone devices. Once one of the telephone devices is taken off-hook, the voltage $V_L$ drops below the threshold of the zener diode 154, thus deactivating the hold circuit 114.

While a call is on hold, the alerting circuit 112 remains inactive as the line voltage $V_L$ is greater than the threshold voltage of the zener diode 132 and there is no current present through the voice path defined by the circuit 110.

In addition to activating the hold circuit 114, the normally closed switch 130 can also be used to permit more than one telephone device to be connected to the telephone line 14 at one time. Returning again to the situation where the telephone device 12A alone is off-hook, opening the switch 130 places the resistor 176 in series with the voice connecting circuit of the privacy circuit 110, thus raising the line voltage $V_L$. Preferably, the magnitude of the resistor 176 is such that the line voltage $V_L$ is raised above the zener breakdown voltage of the zener diodes 122 in the privacy and alerting devices 100 which are connected between the other telephone devices 12B and 12C and the common telephone line 14, thus permitting a voice path to be established between another telephone device 12B or 12C and the telephone line 14. Once the voice path is established between the second telephone device and the line 14, the switch 130 can be returned to its normally closed state.

The operation of the privacy and alerting device 100 connected between the telephone device 12A and the line 14 will now be considered when the telephone 12A alone is in an off-hook state and a potential eavesdropper tries to override the privacy and alerting device 100 on one of the telephone devices 12B or 12C by removing the telephone privacy and alerting device 100 which is connected to that telephone and connecting the telephone device 12A or 12B directly to the line 14. In such a situation, when the second telephone device goes off-hook in addition to the telephone device 12A, the line voltage $V_L$ will drop significantly because the combination of the alerting device 100 and the telephone device 12A in parallel with the further telephone device 12B or 12C results in an overall lower impedance, and thus a greater proportion of the 48 volt drop in the system is attributed to the line impedances $R_L$. Typically the line voltage $V_L$ across the terminals 102 and 104 will drop down to around 3 to 6 volts when more than one telephone device on the line 14 is off-hook, which is lower than the zener threshold of the zener diode 132. As a result, the zener diode 132 ceases conducting current to the base of the first transistor 134, which places the first transistor 134 in an off-state. Because current is present in the privacy circuit 110, the photo-transistor 152 will be on and conducting current to the base of the second transistor 136. The loss of a current path through the first transistor 134 while the photo-transistor 152 is on causes an increase in the potential at the base of the second transistor 136 which is sufficient enough to place the second transistor 136 in an on-state, which in turn provides a path for current to flow through the blinking LED 140. As explained above, the LED 140 is a special low current blinking diode which blinks on and off intermittently when current is supplied to it, thus providing an active visual alarm to the user of the telephone 12A that a further telephone device has been taken off-hook.

The blinking action of the LED 140 is a result of an internal capacitor in the LED 140 which is continually charging and discharging when current is supplied to it. Although this current is quite small, the change in current caused by the oscillatory charging and discharging of the internal capacitor in the LED 140 is significant enough to effect the voice signal on the telephone line 14 by causing a periodic audible "click" to occur in the ear pieces of all off-hook telephone devices attached to the telephone line 14, and also in the ear piece of the telephone device on the other side of the telephone exchange. Thus, the alerting circuit 112 provides an audio alarm in addition to a visual alarm.

The presence of the resistor 126 in the voice circuit 110 is desirable as it increases the change in the line voltage $V_L$ that occurs when a second telephone device goes off-hook in addition to the telephone device 12A, which allows the alerting circuit 112 to operate with greater accuracy.

A switch (not shown) may be placed in the alerting circuit 112 to enable it to be disabled if desired.

It will thus be appreciated that the circuit of FIG. 6 provides a combined telephone privacy and alerting device which will prevent a telephone device from accessing a common telephone line when another telephone device connected to that line is already off-hook. Additionally, the privacy and alerting device 100 of the present invention also has the ability to indicate an alarm when the telephone to which it is connected is off-hook and another telephone device connected to the same line is also off-hook.

The following is a table of the preferred components of the privacy alerting circuit 100:

TABLE

| Reference Number | Device Type or Value |
| --- | --- |
| 118 | 0.001 MF 100V |
| 120 | 2N5060 SCR |
| 122 | ZENER 20V |
| 124 | 2.7K OHM RESISTOR |
| 126 | 47 OHM RESISTOR |
| 128 | 470 OHM RESISTOR |
| 130 | N/C MOMENTARY SWITCH |
| 132 | 10 V ZENER |
| 134 | MPSA42 TRANSISTOR |
| 136 | MPSA42 TRANSISTOR |
| 138 | OPTO-ISOLATOR 4N25-4N37 |
| 140 | LOW POWER BLINKING L.E.D. |
| 142 | 1.MF CAPACITOR |
| 144 | 2M OHM RESISTOR |
| 146 | 1K OHM RESISTOR |
| 148 | 220K OHM RESISTOR |
| 153 | 2N5060 S.C.R. |
| 154 | 12 V ZENER |
| 155 | OPTO-ISOLATOR 4N25-4N37 |
| 156 | L.E.D. |
| 158 | 100 OHM RESISTOR |
| 160 | 200 OHM ½ WATT RESISTOR |
| 162 | 100K OHM RESISTOR |
| 164 | 2.7K OHM RESISTOR |
| 168 | 0.1 MF CAPS |
| 174 | 10K OHM RESISTOR |
| 176 | 470 OHM ½ WATT RESISTOR |

If desirable, the resistors 126 and 176 can be replaced with potentiometers so that the telephone privacy and alerting device 100 can be adjusted according to the telephone line impedances and the characteristics of the telephone devices of a particular telephone system.

It will be appreciated that although as disclosed in FIG. 6 the privacy and alerting device 100 includes a hold circuit 114, the hold circuit 114 could easily be eliminated from the device 100 if no hold function was desired. Similarly, if no alerting function was required a circuit could be constructed without the alerting circuit 112, leaving a device with privacy and hold functions. Additionally, if no privacy functions were required, the zener diode 122 and resistor 124 of the privacy circuit could be eliminated and the SCR 120 could be replaced with a short circuit.

As will be apparent to those skilled in the art, in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A telephone privacy and alerting device for connection to a telephone line and a telephone device, comprising:

a privacy circuit including a voice connecting circuit for connection between the telephone line and the telephone device, said voice connecting circuit having a self-latching switch means having an on and off state; and voltage breakdown means for turning said self-latching switch means on when a closed circuit is provided through the telephone device and the potential across said telephone line is above a first predetermined threshold, thereby allowing said voice connecting circuit to establish a current path between the telephone line and the telephone device; and an alerting circuit for connection to said telephone line, said alerting circuit including alarm means for generating an alarm signal when said alarm means receives a first triggering signal and a second triggering signal simultaneously; current monitoring means responsive to said voice connecting circuit and operatively coupled to said alarm means for providing said first triggering signal when current is present in said voice connecting circuit; and further voltage breakdown means for connection to said telephone line and operatively coupled to said alarm means for providing said second triggering signal when the potential across said telephone line is below a second predetermined threshold.

2. The telephone privacy and alerting device according to claim 1 wherein said first predetermined threshold is lower than the potential across the telephone line when all telephone devices connected to the telephone line are on-hook and generally higher than the normal potential across the telephone line when at least one of the telephone devices connected to the telephone line is off-hook, and said second predetermined threshold is lower than the normal potential across the telephone line when the telephone device is off-hook and any other telephone devices connected to the telephone line are on-hook and higher than the normal voltage across the telephone line when the telephone device is off-hook and at least one other telephone device connected to the telephone line is also off-hook.

3. The telephone privacy and alerting device according to claim 2 further including a parallel combination of a shunt switch and a resistor in series with said voice connecting circuit, the magnitude of said resistor being such that when the telephone device is off-hook and said shunt switch is open and no other telephone devices connected to the telephone line are off-hook, the potential across said telephone line will be raised above said first predetermined threshold.

4. The telephone privacy and alerting device according to claim 3 further comprising a hold circuit for connection to the telephone line for permitting a call to be placed on hold so that the telephone device can be placed on-hook without causing the call on the telephone line to be terminated.

5. The telephone privacy and alerting device according to claim 4 wherein said hold circuit includes a voltage breakdown device which passes current only when the voltage across the voltage breakdown device exceeds a third predetermined threshold; a self-latching switch device having an on and off state connected in series with said voltage breakdown device; and hold circuit gating means responsive to said shunt switch for turning said self-latching switch means on when said shunt switch is open and the telephone device is off-hook.

6. The telephone privacy and alerting device according to claim 5 wherein said third predetermined threshold is greater than said second predetermined threshold and lower than the potential across the telephone line when said shunt switch is open and the telephone device is off-hook.

7. The telephone privacy and alerting device according to claim 1 wherein said further voltage breakdown means comprises a series combination of a zener diode and a resistor; said current monitoring means comprises an opto-isolator having an LED and a photo-transistor, said LED being connected to said voice connecting circuit; and said alarm means comprises a low current blinking LED, a first transistor and a second transistor, the base of said first transistor being operatively engaged by said series combination of said zener diode and said resistor such that said first transistor will be turned off when said zener diode is not in a reverse biased state, the base of said second transistor being electrically connected to said photo-transistor and to said first transistor such that the potential at the base of said second transistor will be sufficient to turn said second transistor on only when said first transistor is off and said phototransistor is on, said low current blinking LED being connected to said second transistor such that current is provided to said low current blinking LED when said second transistor is on.

8. The telephone privacy and alerting device according to claim 7 wherein said self-latching switch means of said privacy circuit includes an SCR and said voltage breakdown means includes a zener diode, the anode of said zener diode being operatively connected to the gate of said SCR.

9. The telephone privacy and alerting device for connection between a telephone line and a telephone device, comprising:

a first rectifier circuit having two AC terminals and two DC terminals, the AC terminals being adapted for series connection between said telephone line and said telephone device;

a voice connecting circuit connected between the DC terminals of said first rectifier circuit, said voice connecting circuit including a self-latching switch means having an on and off state;

a voltage breakdown circuit connected to the DC terminals of said first rectifier circuit for turning said self-latching switch means on when the potential across said first rectifier circuit exceeds a first predetermined threshold, thereby causing said voice connecting circuit to establish a current path between the DC terminals of said first rectifier circuit;

a second rectifier circuit having two AC terminals and two DC terminals, the AC terminals being adapted for connection across said telephone line;

an alarm circuit connected to the DC terminals of said second rectifier circuit for generating an alarm signal when said alarm circuit receives a first triggering signal and a second triggering circuit simultaneously;

a current monitoring circuit responsive to said voice connecting circuit and operatively coupled to said alarm circuit for providing said first triggering signal when current is present in said voice connecting circuit; and a further voltage breakdown circuit operatively coupled to said alarm circuit for providing said second triggering signal when the potential across said telephone line is below a second predetermined threshold.

10. The telephone privacy and alerting device according to claim 9 further including a parallel combination of shunt switch and a resistor connected in series with said voice connecting circuit, wherein opening said shunt switch when the telephone device is the only off-hook telephone device connected to the telephone line will cause the potential across the telephone line to rise above said first predetermined threshold.

11. The telephone privacy and alerting device according to claim 10 further comprising:

a hold path circuit connected across the DC terminals of said second rectifier circuit, said hold path circuit including, in series, a voltage breakdown device for passing current only when the voltage across said voltage breakdown device is above a third threshold value and a self-latching switch device having an on and off state; and gating means operatively connected to said self-latching switch device for turning on said self-latching switch device and thereby establishing a current path through said hold path circuit, wherein when a current path is established through said hold path circuit the telephone device can be placed on-hook without terminating a call on the telephone line.

12. The telephone privacy and alerting device according to claim 11 wherein said gating means is operatively engaged by said parallel combination of said shunt switch and said resistor such that said gating means will turn on said self-latching switch device when current is present in said resistor.

13. The telephone privacy and alerting device according to claim 12 wherein said self-latching switch device includes an SCR and said gating means includes an opto-isolator having a photo-transistor and an LED, said photo-transistor being electrically connected to a gate of said SCR and said LED being electrically connected to said shunt switch and said resistor so that said LED will activate said photo-transistor when current is present in said resistor.

14. The telephone privacy and alerting device according to claim 13 wherein said hold path circuit further includes an LED for indicating when current is present in said hold path circuit, and an audio input connection means for connecting an audio source to said hold path circuit so that an audio signal can be placed on the telephone line when current is present in said hold path circuit.

15. The telephone privacy and alerting circuit according to claim 10 wherein said first predetermined threshold is lower than the potential across the telephone line when all the telephone devices connected to the telephone line are on-hook and generally higher than the normal potential across the telephone line when at least one of the telephone devices connected to the telephone line is off-hook, and said second predetermined threshold is lower than the normal potential across the telephone line when the telephone device is off-hook and any other telephone devices connected to the telephone line are on-hook and higher than the normal voltage across the telephone line when the telephone device is off-hook and at least one other telephone device connected to the telephone line is also off-hook.

16. The telephone privacy and alerting device according to claim 15 wherein said self-latching switch means of said voice connecting circuit includes an SCR and said voice connecting circuit includes a resistor in series with said SCR, and said voltage breakdown circuit includes a zener diode having a breakdown voltage equal to said first predetermined threshold, the anode of said zener diode being operatively connected to a gate of said SCR.

17. The telephone privacy and alerting device according to claim 16 wherein said further voltage breakdown circuit comprises a series combination of a zener diode and a resistor; said current monitoring circuit comprises an opto-isolator having an LED and a photo-transistor, said LED being connected to said voice connecting circuit; and said alarm circuit comprises a low current blinking LED, a first transistor and a second transistor, the base of said first transistor being operatively engaged by said series combination of said zener diode and said resistor such that said first transistor will be turned off when said zener diode of said series combination is not in a reverse biased state, the base of said second transistor being electrically connected to said photo-transistor and to said first transistor such that the potential at the base of said second transistor will be sufficient to turn said second transistor on only when said first transistor is off and said phototransistor is on, said low current blinking LED being connected to said second transistor such that current is provided to said low current blinking LED when said second transistor is on.

18. The telephone privacy and alerting device for connection to a common telephone line and one of at least two telephone devices sharing said line, the privacy and alerting device comprising:

a voice connecting circuit for connection between a respective telephone device and the telephone line, said circuit including a SCR having an on and off state;

means for turning said SCR on when a closed circuit is provided through said respective telephone line operated device, provided the voltage across the telephone line exceeds a first predetermined threshold level, thereby permitting said voice connecting circuit to operate;

an alarm circuit for generating a signal on the telephone line that causes an audio sound to be generated by the ear-piece of said respective telephone line operated device when said alarm circuit receives a first triggering signal and a second triggering signal simultaneously;

a current monitoring circuit responsive to said voice connecting circuit and operatively connected to said alarm circuit for providing said first triggering signal when current is present in said voice connecting circuit; and a voltage monitoring circuit for connection to the telephone line and operatively connected to said alarm circuit for providing said second triggering signal when the voltage across the telephone line drops below a second predetermined threshold level.

19. The telephone alerting device according to claim 18 wherein said first predetermined threshold is lower than the potential across the telephone line when all telephone devices connected to the telephone line are on-hook and generally higher than the normal potential across the telephone line when at least one of the telephone devices connected to the telephone line is off-hook, and said second predetermined threshold is lower than the normal potential across the telephone line when said respective telephone device is off-hook and any other telephone devices connected to the telephone line are on-hook and higher than the normal voltage across the telephone line when more than one telephone device connected to the telephone line is off-hook.

20. The telephone privacy and alerting device according to claim 19 further including a parallel combination of a normally closed switch and a resistor connected in series with said voice connecting circuit for temporarily raising the voltage across the telephone line above said first predetermined threshold when said respective telephone device is off-hook and said normally closed switch is opened.

21. An alerting device for connection to a telephone line and a telephone device, the alerting device comprising:

a voice circuit for series connection between the telephone line and the telephone device;

an alarm circuit for generating a periodic audio signal in the ear-piece of the telephone device when said alarm circuit receives a first triggering signal and a second triggering signal simultaneously;

a current monitoring circuit connected to said voice circuit for detecting the presence of current in said voice circuit, said current monitoring circuit being operatively connected to said alarm circuit for providing said first triggering signal to said alarm circuit when current is present in said voice circuit; and a voltage monitoring circuit for connection to the telephone line for detecting when the voltage across the telephone line drops below a threshold value, said voltage monitoring circuit being operatively connected to said alarm circuit for providing said second triggering signal to said alarm circuit when said voltage is below said threshold.

* * * * *